3,333,992
PRODUCTION OF ORIENTED SILICON-IRON USING GRAIN GROWTH INHIBITOR DURING PRIMARY RECRYSTALLIZATION HEAT TREATMENT

Dale M. Kohler, Middletown, Ohio, assignor to Armco Steel Corporation, Middletown, Ohio, a corporation of Ohio Filed June 29, 1964, Ser. No. 378,823
13 Claims. (Cl. 148—113)

ABSTRACT OF THE DISCLOSURE

A process for producing cube-on-edge oriented silicon-iron stock including the steps of hot reducing the silicon-iron, removing the scale, cold rolling to final gauge, and subjecting the stock to a final anneal consisting of a primary grain growth stage and a secondary grain growth stage. A grain growth inhibitor is provided in the environment of the stock and is caused to be diffused into the grain boundaries thereof during the primary grain growth stage of the final anneal, whereby to favor the growth of cube-on-edge nuclei during the secondary grain growth stage. The inhibitor is chosen from the class consisting of sulfur, selenium and compounds thereof.

---

This invention relates to the production of silicon-iron sheet stock for magnetic uses, and in which the body-centered cubes making up the grains or crystals are oriented in the cube-on-edge position, designated (110) [001] in accordance with Miller's indices. As is well known, stocks having this orientation are characterized by a relatively high permeability in the rolling direction and a relatively low permeability in a direction at a right angle thereto. The term "relatively" is used because ladle chemistry and processing variables affect the straight grain permeability even in materials having predominantly the orientation indicated above. Also the matter of grain size is important in the magnetic performance of the final product.

The greater part of the cube-on-edge oriented silicon-iron sheet stock is currently made by hot rolling ingots or slabs of a suitable composition to an intermediate gauge, pickling and heat treating the hot-rolled product, cold rolling it to gauge, usually in two stages, with an intermediate anneal, and subjecting it to a final anneal at a temperature high enough to cause secondary recrystallization. The secondary recrystallization has been of the grain boundary energy type.

The various factors of processing and chemistry have hitherto been seen as critical. For example, the amount of cold rolling and the number of stages of cold rolling have generally been regarded as critical despite the fact that cube-on-edge stock can be made by various routings. But the factors are also interrelated. It was taught by Littmann and Heck in U.S. Patent No. 2,599,340 issued June 3, 1952, that superior permeabilities could be obtained in silicon-irons which were hot rolled to the intermediate gauge from a high slab temperature. It has been ascertained that the high hot rolling temperature has to do in part at least with the precipitation of sulfides such as manganese sulfide in the silicon-iron, and that the attainment of superior permeabilities by hot rolling from a high temperature was not entirely a matter of grain size or grain orientation at the end of the hot rolling.

It is a primary object of this invention to obtain cube-on-edge grain growth by a process which is less sensitive to ladle chemistry and processing variables than the hitherto known processes.

It is an object of the invention to produce a more vigorous and complete secondary grain growth in the final anneal.

It is an object of the invention to provide a way in which cube-on-edge secondary grain growth may be induced in silicon-iron sheet stock which under normal circumstances of processing would not exhibit this type of grain growth to any great degree.

These and other objects of the invention which will be set forth hereinafter or will be apparent to the skilled worker in the art upon reading these specifications are accomplished in those procedures and products of which certain exemplary embodiments will now be described. Reference is made to the accompanying drawings in which.

Figure 1:
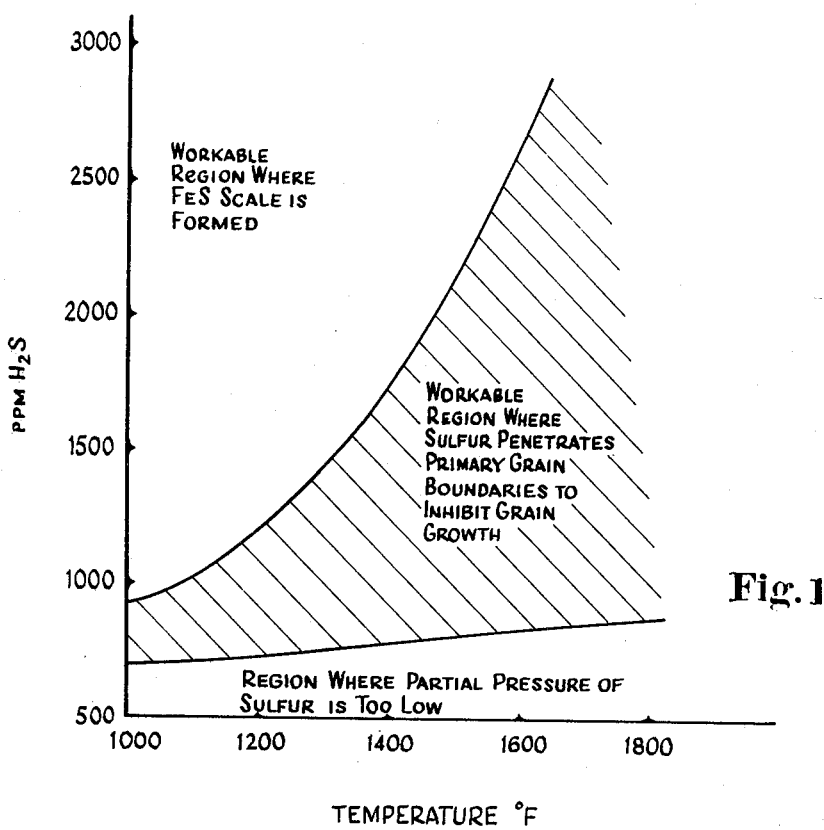
FIGURE 1 shows graphically the effect of sulfur in the annealing atmosphere at various temperatures.

It has hitherto been suggested that sulfur in the silicon-iron stock is of importance in the obtaining of a cube-on-edge orientation. The sulfur in the form of sulfides was understood to act as an inhibitor of normal grain growth after primary recrystallization. But the amount of sulfur present at that time was assumed to depend upon the sulfur in the melt. Also the distribution of the sulfur, which in turn depends upon the various heat treating steps practiced between the melt stage and the final anneal, was important. It was thus deemed necessary that the ladle analysis of the silicon-iron should show a substantial quantity of sulfur, say at least .015%, and that the subsequent processing should be such as to leave in the cold reduced stock at the time of the final anneal a sufficient quantity of sulfur to permit the attainment of the desired cube-on-edge orientation and grain size.

In accordance with the present invention it has been found that the quantity of sulfur in the ladle analysis may vary between much wider limits than was heretofore taught. The initial sulfur content may vary from extremely low values, say about .010% or somewhat less, to the values presently used; but the amount and distribution of sulfur necessary during an anneal in which primary grain growth occurs can be accurately controlled during or just before the anneal. Thus it is possible to allow the sulfur content of the stock at any stage of the processing to vary from values too low to effectively inhibit primary grain growth by prior processes to values even above those formerly considered the maximum. The upper limit is now determined by the degree to which the sulfur remaining after the final anneal harms the magnetic properties. The sulfide distribution is also much less a factor, especially since it can be controlled in a new way. By the same token, intermediate heat treatments at a temperature or in an atmosphere which may deplete the sulfur content at the grain boundaries, either before cold rolling or intermediate the various stages of cold rolling, will not prevent the attainment of the desired orientation and grain size in accordance with the practice of this invention.

Briefly, the practice of this invention involves the treatment of the silicon-iron sheet stock with sulfur or sulfur compounds at final gauge and immediately prior to or during the primary grain growth portion of an anneal. There are various ways in which this can be done. The invention can be practiced by the addition of ferrous sulfide, or other sulfur compound which dissociates or decomposes at the temperatures of primary grain growth, to the annealing separator employed during the final heat treatment. Elemental sulfur can also be added to the separator for the same purpose.

The preferred annealing separators are magnesia, alumina and calcium oxide or mixtures of these, in finely divided form, although other substances may be used, if desired, such as titania and other refractory metal oxides. In the practice of this invention cube-on-edge secondary grain growth has been successfully induced in materials not suitable for such orientation and grain growth when treated in the conventional manner, by the addition of as little as $\frac{1}{10}$ of 1% and up to about 1% of ferrous sulfide, or .005% to .025% of elemental sulfur to the annealing separator, both based on the weight of the metal charges. Or from about 1% to about 5% of sulfur may be added to the annealing separator if the separator is applied in a proportion of about 10 pounds per ton of silicon-iron. This is the equivalent of about $\frac{1}{10}$ to about $\frac{1}{2}$ pound of sulfur per ton of iron.

The final anneal, which includes both a primary grain growth and a secondary grain growth, is usually an anneal in dry hydrogen in a muffle or box. The anneal may be carried on with the material in the form of stacked sheets or wound coils; and if the atmosphere of the annealing furnace is required to act upon the silicon-iron, excellent results may be obtained by annealing in loose coils formed in accordance with modern techniques. Whether or not the sheets in a pack or the convolutions of a coil are in close contact, it is preferred that the content of the sulfur-bearing material at the surfaces be maintained within the above limits.

It is believed that the sulfur or sulfur compound reacts with the dry hydrogen annealing atmosphere to form hydrogen sulfide and that the sulfur is transferred to the steel by means of the hydrogen sulfide as a carrier, and reacts with the steel to form sulfides at the grain boundaries. The reaction occurs between about 1000° F. and about 1800° F. The absorption creates high sulfur concentrations at the grain boundaries of the primary structure, tending to prevent the primary grain structure from undergoing such grain growth as would interfere with subsequent secondary recrystallization. Thus a finely grained matrix is maintained until secondary grains of cube-on-edge orientation begin to consume the grains of other orientations. Thereafter, as the temperature rises further, secondary grain growth will proceed by grain boundary energy and will convert the fine grain matrix into a well developed cube-on-edge structure.

It follows from this explanation that instead of including sulfur or a sulfur-bearing compound in the annealing separator, comparable results may be achieved by charging the annealing atmosphere with hydrogen sulfide or any other gaseous sulfur compound, such as sulfur dioxide, sulfur hexafluoride and the like, which would react at the grain boundaries at temperatures around or slightly above 1000° F. This may be done during the primary grain growth period which occurs during the heating of the material up to the temperature at which secondary recrystallization occurs in a final anneal. It is believed that selenium or hydrogen selenide would behave similarly to sulfur or hydrogen sulfide, although these substances are more expensive.

In yet another variant procedure, the sulfur or sulfur-bearing compound may be made available at the surfaces of the sheet material during a decarburizing anneal prior to the final anneal. For example, if a silicon-iron strip is moved through an elongated furnace containing a special atmosphere for removing carbon, it is possible to mix hydrogen sulfide with the decarburizing atmosphere to control grain growth during the primary grain growth stage occurring as part of the decarburizing treatment, or, as more specifically taught hereinafter, to form a controlled iron sulfide scale on the material which will inhibit the primary grain growth which continues during the subsequent final anneal. The atmosphere for decarburizing is ordinarily wet hydrogen, which is oxidizing to silicon but relatively non-oxidizing to iron.

The best and most successful prior art procedure for the manufacture of cube-on-edge silicon-iron has involved hot rolling the material from a high initial temperature of about 2500° F., which is now understood to result in the solution of the manganese sulfide phase in the steel. The material, hot rolled in this manner to a gauge of about .100″ or less, is generally believed to contain a fine dispersion of sulfide inclusions formed by precipitation during hot rolling.

It is then cold rolled in one or two stages of closely controlled reduction to a final gauge of about .012″. There will have been at least one intermediate heat treatment involving a gaseous decarburization. By the time the material has been reduced to the final gauge mentioned above, the prior art has not disclosed hitherto any step or procedure which would insure the development of cube-on-edge secondary grain growth in the final anneal.

In accordance with the present invention it becomes possible to exert an external force during the period in which the primary grains are growing and prior to the secondary grain growth stage. It is well understood that the primary grains can become so large that it is impossible for the cube-on-edge nuclei to absorb or consume large grains of undesirable orientations during the secondary growth period which begins at 1700° to 1800° F. and continues at higher temperatures. This makes the processing steps and the ladle analysis less important. For example, secondary grain growth of excellent character has been successfully induced in materials which had been hot rolled from a low slab temperature of 2100° F. to a thickness of about .050″, pickled, annealed at 1675° F., cold rolled to about .011″, and then box annealed with sulfur added to the annealing separator. The permeability in the rolling direction at H=10 oersteds of one lot of this material which was annealed without adding sulfur was 1620; adding 2% sulfur to the magnesia coating of another lot of the same material increased its straight-grain permeability to 1775.

The amount of elemental sulfur or sulfur in the form of a sulfur-bearing compound added to the annealing separator has been determined broadly as from about .0025% to about .05% of the metal charge, or from about .05 to one pound of sulfur per ton of the metal charge. In terms of the sulfur content of the annealing separator, it is possible to use from about ½% to 10%, the aforementioned range of 1 to 5% being preferred based on 10 pounds of MgO per ton; but the quantity of sulfur made available to the silicon-iron may exceed the solubility of sulfur in the area of the grain boundaries. Some sulfur will be lost during the drying of a slurry coating and the handling of the dried coating. Therefore it is necessary to add sufficient excess to make up for this loss, and the values disclosed refer in all cases to the amount of sulfur or sulfide present during the heat treatment.

The total sulfur content of the silicon-iron is not necessarily controlling. The presence of sulfides at the grain boundaries is of primary importance. It follows that a silicon-iron having sufficient sulfides at the grain boundaries may be suitable for primary and secondary grain growth even though its total sulfur content may be relatively low, whereas a treatment which tended to remove sulfides at the grain boundaries might impair the ability of the material to acquire a high degree of cube-on-edge orientation even though it did not appreciably lower the total sulfur content of the silicon-iron. Consequently, the preferred practice of this invention involves the later addition of some sulfide to the usual silicon-iron, substantially irrespective of its total sulfur content, especially since the sulfur of sulfide added by the procedures herein taught occurs primarily at the grain boundaries. By the time the charge is heated to the secondary recrystallization temperature of about 1800° F. the sulfur content will preferably have been increased by about .0005% to about .003%.

Smaller amounts would indicate that the grain size has not been sufficiently retarded, while greater amounts might adversely affect magnetic properties. It will be understood by those skilled in the art that the amount of sulfur in the silicon-iron will decrease as the charge is heated to 2000° F. and above during the secondary grain growth period until the final sulfur in the interior of the silicon-iron is less than .005%.

Whether the sulfur is added to the annealing separator, or whether hydrogen sulfide or some other decomposable sulfur compound is added to the annealing atmosphere as such, the effective amount of sulfur present at any stage of the annealing is conveniently found by analysis of the annealing atmosphere if there is intimate contact of the steel and atmosphere. In the accompanying drawing, FIGURE 1 is based on such analyses. The shaded area is the area in which sulfur should be maintained throughout the temperature range of primary grain growth. This may be done by adding hydrogen sulfide or the like to the annealing atmosphere during primary grain growth or it may be done by including sufficient elemental sulfur or a decomposable sulfur compound in the annealing separator applied prior to the anneal.

It will be noted in FIGURE 1 that there is a range in which an iron sulfide scale is formed on the surfaces of the metal. Forming a thin layer of an iron sulfide scale about .02 mil to about .10 mil thick during a prior anneal of short duration, and then wrapping a coil tightly or stacking sheets for the final anneal, is another way in which the invention may be practiced.

The use of vacuum annealing is not precluded in the practice of this invention. Also, nitrogen or other inert gases may be used with or without hydrogen or in a partial vacuum. Sulfur is apparently capable of direct diffusion into the metal from the annealing separator.

Any of the routings heretofore employed in the manufacture of cube-on-edge stock may be employed in the practice of this invention; but other routings heretofore not considered to produce the best permeabilities can also be employed.

Further examples may be given as follows:

*Example I*

A silicon-iron containing .025% carbon, .101% manganese, .024% sulfur and 3.03% silicon was hot rolled to a thickness of .060″ from a slab temperature of 2550° F. It was then annealed at 1800° F. and pickled, after which it was cold rolled in a single stage to a thickness of .014″ and decarburized in an open or strand anneal at 1500° F. for 3 minutes, in wet hydrogen, i.e., hydrogen having a dew point of 130° F.

One lot of this material was box annealed in dry hydrogen at 2200° F., and was found to have a straight grain permeability at H=10 oersteds of 1595.

Another lot of the same material was box annealed at 2200° F. in a hydrogen atmosphere containing continuously about 770 p.p.m. of hydrogen sulfide. This material, treated in accordance with this invention, was found to have a straight grain permeability at H=10 oersteds of 1805.

Figure 2:
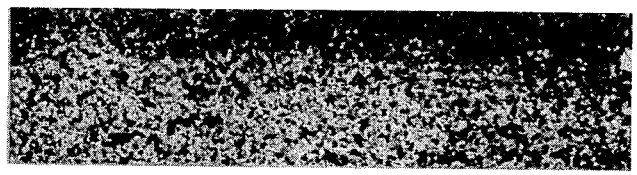
FIGURES 2 and 3 are actual size photomicrographs showing grain conditions in the products of Example I.

FIGURE 2 shows the final grain condition of the first batch of material. It will be noted that very little secondary recrystallization has taken place because the grain size as a result of primary grain growth is too large.

Figure 3:
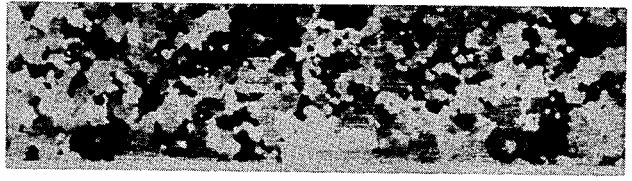

FIGURE 3 shows the final condition of the second batch of material. It will be noted that a marked secondary recrystallization has occurred.

*Example II*

Another silicon-iron containing .027% carbon, .083% manganese, .026% sulfur, and 3.18% silicon was hot rolled to a thickness of .076″. It was then annealed at 1675° F. and pickled. It was cold rolled in a first stage to .022″, then annealed at 1675° F. and pickled. It was cold rolled in a second stage to a thickness of .011″ and decarburized at 1500° F. in an open anneal in hydrogen having a dew point of 130° F.

A first batch of the material so treated was box annealed in dry hydrogen and was found to have a straight grain permeability at H=10 oersteds of 1755.

A second batch of the same material was box annealed in a flowing hydrogen atmosphere to which hydrogen sulfide was continuously added to maintain a level of about 770 p.p.m. It was found to have a straight grain permeability at H=10 oersteds of 1840.

*Example III*

A heat of silicon-iron originally containing .029% carbon, .116% manganese, .025% sulfur and 3.24% silicon was vacuum remelted, after which by analysis it was found to contain .016% carbon, .046% manganese, .015% sulfur and 3.08% silicon. The vacuum remelted stock was hot rolled to .049″ from a slab temperature of 2400° F., annealed at 1675° F. and pickled. It was then cold rolled to .012″.

One lot of this material was decarburized in an open or strand anneal at 1500° F. for 3 minutes in wet hydrogen as above defined. As a final treatment, this first lot was coated with magnesium oxide as an annealing separator and was box annealed at 2200° F. in hydrogen. It was found to have a straight grain permeability at H=10 oersteds of 1670.

Figure 4:
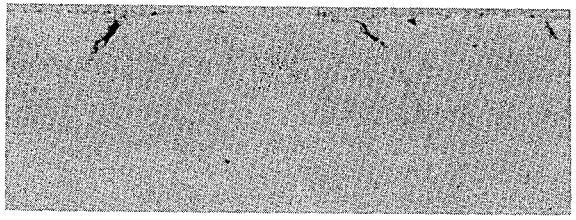
FIGURE 4 is a photomicrograph at 1000× showing the formation of an iron sulfide scale and the start of diffusion of the iron sulfide into the base metal along grain boundaries as in Example III.

A second lot of the same material was decarburized in an open or strand anneal at 1500° F. for 3 minutes in wet hydrogen having a dew point of 130° F. This atmosphere contained 2800 p.p.m. of hydrogen sulfide. The result of this strand anneal in the presence of hydrogen sulfide is illustrated in FIGURE 4, which is a photomicrograph at 1000×. It will be noted that a thin scale of iron sulfide has formed on the surface of the silicon-iron sheet stock and that some of the iron sulfide has begun to diffuse into the grain boundaries. The silicon-iron sheet stock bearing the thin iron sulfide scale was coated with magnesium oxide and box annealed at 2200° F. It was found to have a straight grain permeability at H=10 oersteds of 1775.

*Example IV*

The success of this invention in commercial mill practice was further substantiated by the following procedures.

Silicon-iron containing by a ladle analysis. .025% carbon, .059% manganese, .019% sulfur and 2.58% silicon was hot rolled to .060″, open annealed at 1800° F. and pickled, cold rolled to .014″, and decarburized in a strand anneal at 1500° F. in a wet hydrogen atmosphere. One coil of this material was coated with a magnesia slurry containing no added sulfur and box annealed for several hours at 2175° F. in a hydrogen atmosphere. Another coil of the material was coated with a slurry of magnesia to which sulfur had been added. It was determined that the magnesia coating after drying contained ½% sulfur by weight. This coil was box annealed in exactly the same manner as the coil coated with the standard grade of magnesia. It was found that the magnetic permeability at 10 oersteds had been increased from 1735 to 1820 by the sulfur additions to the magnesia.

By silicon-iron is meant in general a ferrous material containing from about 2.00 to 3.5% silicon, and from about .040% to .15% manganese. The carbon content should be usually about .025%, but the product should be subjected to a decarburization treatment as a part of the routing. The balance of the alloy should be substantially all iron excepting for normal trace impurities incident to the mode of manufacture, although the process of the invention may apply to any alloy in which the selective growth of particularly oriented grains is at least partially controlled by adding a grain growth inhibiting substance when the alloy is in a solid state.

The effective sulfur content in the environment of the steel should be maintained during the primary grain growth period until the temperature of the steel reaches about 1800° F. When this is done grain growth will be satisfactorily inhibited and the cube-on-edge grains will be free to take over and control the final orientation of the product during secondary growth. Generally speaking, the amounts of sulfur used effectively in the practice of this invention may be stated as follows:

(1) Where elemental sulfur, such as yellow powder or flowers of sulfur, is added to an annealing separator, about ½% to 10% sulfur, preferably 1% to 5%, is used, based on the weight percent of the coating where the coating is used in normal thicknesses for annealing separation. This is equivalent to the use of about .0025% to about .05% of elemental sulfur based on the weight of the silicon-iron being treated.

(2) Where ferrous sulfide is used to provide the sulfur, the annealing separator should contain from about 1/10% to 1% of this compound, based on the weight of the metal charge.

(3) Where hydrogen sulfide is added to a decarburizing atmosphere to form a film or scale of iron sulfide to control primary grain growth in a subsequent anneal, the treatment should be so regulated as to form a sulfide scale having a thickness of about .0001″ (.1 mil) to about .00002″ (.02 mil).

(4) In any event, and whether or not sulfur is added to form an iron sulfide scale, or whether or not sulfur is added during the primary grain growth portion of a final anneal, the addition being made either to the annealing atmosphere or to an annealing separator, or both, best results are obtained when the quantity of sulfur so added is such as to raise the sulfur content of the steel by no more than about .003% and not less than about .0005% by the time the steel has reached a temperature of about 1800° F. in the final anneal.

It will be understood that modifications may be made without departing from the spirit of the invention, and no limitations are intended other than as specifically set forth in the claims which follow.

The embodiments of the invention in which an exclusive property or privilege is claimed are defined as follows:

1. In a process of producing cube-on-edge oriented silicon-iron stock comprising the steps of hot reducing the silicon-iron, removing the scale, cold rolling to final gauge, and subjecting said stock to a final anneal consisting of a primary grain growth stage and a secondary grain growth stage; the improvement comprising the steps of providing a grain growth inhibitor in the environment of the stock during said primary grain growth stage and diffusing said inhibitor into the grain boundaries of said stock during said primary grain growth stage, whereby to favor the growth of cube-on-edge oriented nuclei during said secondary grain growth stage, said inhibitor being chosen from the class consisting of sulfur, selenium and compounds thereof.

2. The process claimed in claim 1 including the steps of subjecting said stock to a decarburizing anneal immediately prior to said final primary grain growth stage and adding to the atmosphere of said decarburizing anneal a quantity of sulfur compound sufficient to form on the surfaces of said stock a layer of iron sulfide having a thickness of about .02 mil to about .1 mil.

3. The process claimed in claim 1 wherein the presence of said inhibitor in the said primary grain growth stage is effected by entraining said inhibitor in an annealing atmosphere employed in said stage, said inhibitor being decomposable in the presence of the silicon-iron at the temperatures of said primary grain growth stage.

4. The process claimed in claim 1 wherein the presence of said inhibitor in said primary grain growth stage is effected by using a refractory annealing separator containing said inhibitor, said inhibitor being decomposable at the temperatures of primary grain growth.

5. The process claimed in claim 3 in which said inhibitor is hydrogen sulfide, the quantity of said hydrogen sulfide present at the surfaces of the silicon-iron being above about 700 parts per million.

6. The process claimed in claim 1 wherein the stock is hot rolled from a temperature of less than about 2300° F.

7. The process claimed in claim 4 wherein said inhibitor is elemental sulfur and the presence of said elemental sulfur in said primary grain growth stage is effected by using a refractory annealing separator containing from about .05 to about one pound of elemental sulfur per ton of the metal charge.

8. The process claimed in claim 4 wherein said inhibitor is elemental sulfur and the presence of said elemental sulfur in said primary grain growth stage is effected by using a refractory annealing separator containing from about .1 to about .5 pound of elemental sulfur per ton of the metal charge.

9. The process claimed in claim 4 wherein said inhibitor is elemental sulfur and the presence of said elemental sulfur in said primary grain growth stage is effected by using a refractory annealing separator containing from about .0025% to about .05% of elemental sulfur based upon the weight of the metal charge.

10. The process claimed in claim 4 wherein said inhibitor is elemental sulfur and said elemental sulfur is added to an annealing separator associated with the said silicon-iron stock, the said annealing separator containing about ½% to about 10% elemental sulfur by weight.

11. The process claimed in claim 1 wherein said inhibitor is chosen from the class consisting of sulfur and compounds thereof, the amount of said inhibitor being sufficient to raise the sulfur content of the silicon-iron by no more than about .003% and by not less than about .0005% by the time the silicon-iron has reached a temperature of about 1800° F. in said final anneal.

12. The process claimed in claim 4 wherein said inhibitor is elemental sulfur, and from about 1% to about 5% of elemental sulfur is added to the said annealing separator based on a normal thickness of coating.

13. The process claimed in claim 4 wherein said inhibitor is ferrous sulfide, and from about .1% to about 1% of ferrous sulfide is added to the annealing separator, based on the weight of the metal charge.

References Cited

UNITED STATES PATENTS

| | | | |
|---|---|---|---|
| 2,867,558 | 1/1959 | May | 148—111 |
| 3,090,711 | 5/1963 | Kohler | 148—111 |
| 3,130,093 | 4/1964 | Kohler | 148—111 |
| 3,130,094 | 4/1964 | Kohler et al. | 148—111 |
| 3,130,095 | 4/1964 | Kohler et al. | 148—113 |
| 3,152,930 | 10/1964 | Foster | 148—113 |

OTHER REFERENCES

Kohler: J. of Applied Physics, Supplement to vol. 31, No. 5, May 1960, pp. 408S–409S.

DAVID L. RECK, *Primary Examiner.*

HYLAND BIZOT, *Examiner.*

N. F. MARKVA, *Assistant Examiner.*